United States Patent [19]
Seki et al.

[11] Patent Number: 5,621,288
[45] Date of Patent: Apr. 15, 1997

[54] MOTOR SPEED REGULATING CIRCUIT WITH STARTER AND STORAGE MEDIUM DRIVE USING THE SAME

[75] Inventors: Kunio Seki, Tokyo; Toshiyuki Tsunoda, Maebashi; Yuichi Ohkubo, Takasaki, all of Japan

[73] Assignee: Hitachi, Ltd., Tokyo, Japan

[21] Appl. No.: 340,372

[22] Filed: Nov. 14, 1994

[30] Foreign Application Priority Data

Nov. 18, 1993 [JP] Japan .................................. 5-289361

[51] Int. Cl.⁶ .............................. H02P 1/18; G11B 19/20
[52] U.S. Cl. ......................... 318/431; 318/603; 369/239
[58] Field of Search .................................... 318/138, 254, 318/430, 431, 439, 600, 601, 603; 388/809, 912, 928.1; 369/233, 239

[56] References Cited

U.S. PATENT DOCUMENTS

| | | |
|---|---|---|
| 3,700,986 | 10/1972 | Cushman et al. . |
| 3,858,100 | 12/1974 | Bussi et al. . |
| 3,859,581 | 1/1975 | Gardner . |
| 4,027,217 | 5/1977 | Harman . |
| 4,451,112 | 5/1984 | Hattori et al. . |
| 4,761,591 | 8/1988 | Hartwig . |
| 4,879,501 | 11/1989 | Haner . |
| 4,967,123 | 10/1990 | Lebsock . |

FOREIGN PATENT DOCUMENTS

| | | |
|---|---|---|
| 55-109183 | 8/1980 | Japan . |
| 61-154492 | 7/1986 | Japan . |
| 63-310391 | 12/1988 | Japan . |

Primary Examiner—Bentsu Ro
Attorney, Agent, or Firm—Fay, Sharpe, Beall, Fagan, Minnich & McKee

[57] ABSTRACT

A motor speed regulating circuit includes a speed signal generator for generating a speed signal having a frequency proportional to the speed of the motor, synchronously with the rotation of the motor. A time difference detector is used for detecting a time difference between the period of the speed signal and a predetermined standard time. A control voltage generator is used for generating a speed control voltage to be applied to the motor in accordance with a detected time difference and feedback-controlling the speed of the motor in accordance with the standard time. A starter is used for starting the motor after the motor is stopped. The motor can be reliably restarted after it has been stopped.

17 Claims, 15 Drawing Sheets

$V_{th1} < V_{th2}$

Vth1 < Vth2

MOTOR SPEED REGULATING CIRCUIT WITH STARTER AND STORAGE MEDIUM DRIVE USING THE SAME

BACKGROUND OF THE INVENTION

1. Field of the Invention

The present invention generally relates to a speed regulating apparatus for motors, more particularly to a technique applicable to speed control of spindle motors, to a motor speed regulating circuit effectively applicable to a semiconductor integrated circuit (IC) device dedicated to a unit for controlling mechanisms of drives such as floppy disk drives, hard disk drives, and optical disk drives, and to a storage medium drive using the motor speed regulating circuit.

2. Description of the Related Art

In a floppy disk drive (FDD) or a hard disk drive (HDD), a rotation speed of a motor for driving a storage medium disk is detected by a tachometer generator as a function of frequency, and in accordance with the detected frequency the speed of the motor is subjected to a feedback control.

The motor speed regulating apparatus of this type has been proposed, for example, in JP-A-61-154492 (Document (1)) in which two counters count clocks synchronously with the start and end of each half cycle of a speed signal of a motor detected as a function of frequency. This is done in order to always detect a difference from a standard time. A speed control voltage is adjusted in accordance with the detected time difference for the feedback control of the motor speed.

The cost and consumption power of a motor and its peripheral circuit used in an information processing apparatus amounts to a large percentage. Thus, it is a significant issue to reduce the cost and consumption power. In the case of a motor speed regulating circuit, the cost and consumption power of counters for generating a standard time corresponding to a standard speed also occupy a large percentage.

In an FDD, counters for generating a standard time are provided in the speed regulating circuit without using CPU software counters. Therefore, the cost and consumption power depend largely on the number of hardware counters.

A speed regulating circuit, in which only one counter is used to count clocks synchronously with one of the start and end of each half cycle of a speed signal, is described in JP-A-63-310391 (Document (2)) and JP-A-55-109183 (Document (3)).

SUMMARY OF THE INVENTION

The inventors of this application have studied a motor speed regulating circuit using only one counter which is a circuit generally requiring a large number of circuit elements.

FIG. 1 briefly shows the structure of a motor speed regulating circuit studied by the inventors of the present application.

The speed regulating circuit has an amplifier 11 constituting an input circuit for a main clock ϕ, a counter 12 for determining a standard time (tn) by counting a predefined number n of main clocks ϕ, a comparator 14, a ½ frequency divider 15, an error detector 16, a control amplifier 17, a circuit (Hall amplifier) 18 for detecting a rotation phase of a rotor, for example, in accordance with outputs of Hall sensors 18a to 18c, a motor driver 19 having a commutation control function and other functions, a bias circuit 20 for supplying bias voltages to the speed regulating circuit for controlling the enabled/disabled operation of the speed regulating circuit, a tachometer generator 23 coupled to a motor 22 such as a three-phase brushless motor, a control voltage generator 31, and a time constant circuit 32.

The circuit elements 11 to 19, and 31 are integrally formed as a single semiconductor integrated circuit 1. When a control signal (chip select signal) supplied from the outside of the semiconductor integrated circuit 1 takes an active level, the bias circuit 20 generates and supplies bias voltages to the circuit elements 11 to 19, and 31 to change the disabled operation where power is scarcely consumed, to the enabled operation of the circuit elements 11 to 19, and 31 of the semiconductor integrated circuit 1. Each mark O in FIGS. 1, 4, 13, 15 and 16 designates a terminal.

FIG. 2 is a timing chart briefly explaining the operation of the motor speed regulating circuit described above.

Referring to FIGS. 1 and 2, the tachometer generator 23 generates a rotation speed of the motor 22 as a function of frequency. The tachometer generator 23 outputs a speed signal Vf having a frequency proportional to the rotation speed, synchronously with the motor rotation. The speed signal Vf detected by the tachometer generator 23 is supplied to the comparator 14 which forms a speed pulse signal V1 taking high (H) and low (L) binary logical levels. This speed pulse signal V1 is changed by the ½ frequency divider 15 to a speed pulse signal V2 having H and L level periods with the same time duration (tf).

The counter 12 starts counting a predetermined number n of main clock's ϕ each time the speed pulse signal V2 rises from L to H, and continues to output an H level until the count is completed. Therefore, the counter 12 outputs a pulse signal Vt having a width corresponding to the standard time tn each time the speed pulse signal V2 rises from L to H.

The error detector 16 detects a difference (tf–tn) or (tn–tf) between the standard time tn and the H level period of the speed pulse signal V2, and outputs an error pulse signal V3 having a pulse width (tf–tn) or (tn–tf). The error pulse signal V3 takes either V31 if tf>tn or V32 if tn>tf. That is to say, if the motor 22 is at a low speed and the H level period tf of the speed pulse signal V2 is longer than the standard time tn (tn<tf), then the first error pulse V31 having the pulse width (tf–tn) is outputted. On the other hand, if the motor 22 is at a high speed and the H level period tf of the speed pulse signal V2 is shorter than the standard time tn (tf<tn), then the second error pulse V32 having the pulse width (tn–tf) is outputted.

When the first error pulse signal V31 is inputted, the control voltage generator 31 charges the capacitor circuit (time constant circuit) 32 connected to the semiconductor integrated circuit 1 for the time period corresponding to the pulse width (tf–tn), whereas when the second pulse signal V32 is inputted, the control voltage generator 31 discharges the capacitor circuit 32 for the time period corresponding to the pulse width (tn–tf). Therefore, a voltage across a capacitor of the capacitor circuit 32 is raised or lowered in accordance with a motor speed detected as a difference from the standard time tn. This voltage of the capacitor circuit 32 is supplied via the control amplifier 17 to the driver 19 as a speed control voltage Vcp. The driver 19 drives the motor by a drive power determined by the speed control voltage Vcp.

In this manner, the speed of the motor 22 is subjected to a precise feedback control in accordance with the standard time tn generated by the single counter.

The present inventors have found the following problems associated with the above-described technique and documents (1) to (3).

In the motor speed regulating circuit, the motor speed is regulated by a drive power of the motor, and the drive power is controlled by the speed control voltage Vcp which is generated based upon the speed signal Vf detected from the motor and the time pulse signal Vt generated by the counter.

If the motor is stopped once for power conservation or the like, the speed signal Vf cannot be detected from the motor. In this case, the motor may not be restarted as shown in FIG. 3 because the speed control voltage Vcp for the speed signal Vf cannot be generated and a motor drive power is not generated. FIG. 3 shows a case where the motor is thereafter started forcedly.

Whether the motor can be restarted by using the motor speed regulating circuit shown in FIG. 1 depends on an output state of the ½ frequency divider 15 after the motor 22 is stopped.

Specifically, as shown in FIG. 2, if an output logical state of V2 of the ½ frequency divider 15 when the motor is stopped, is H, then the counter 12 is set to start counting clocks and outputs the pulse signal Vt. Therefore, the speed control voltage Vcp and the motor drive power can be generated to restart the motor.

However, as shown in FIG. 3, if an output logical state of V2 of the ½ frequency divider 15 when the motor is stopped, is L, then the counter 12 does not start counting. Therefore, the speed control voltage Vcp and the motor drive power cannot be generated and the motor cannot be restarted.

With the circuit shown in FIG. 1, the motor cannot be restarted at a probability of one second.

The inventors have also confirmed that power conservation of storage medium drives such as FDDs and HDDs or of information processing apparatuses using drives can be achieved very effectively if a motor and its peripheral circuit requiring a relatively large consumption power are operated only when necessary and the power supplied to them is substantially stopped when unnecessary. For such power conservation, it is necessary to restart the motor reliably and smoothly.

It is an object of the present invention to provide a motor speed regulating circuit and a storage medium drive, capable of providing a high precision speed control of a motor with a circuit having a relatively small number of circuit elements and providing a reliable and smooth restart of the motor.

According to an aspect of the present invention, there is provided a motor speed regulating circuit which includes a speed signal generator for generating a speed signal having a frequency proportional to the speed of the motor, synchronously with the rotation of the motor, a time difference detector for detecting a time difference between the period of the speed signal and a predetermined standard time, a control voltage generator for generating a speed control voltage to be applied to the motor in accordance with a detected time difference and feedback-controlling the speed of the motor in accordance with the standard time, and a starter for starting the motor after the motor is stopped.

According to an example of the present invention, the starter includes a circuit for applying a start signal to a signal path of the speed control voltage to be applied to the motor by the control voltage generator, when the motor is started.

According to the present invention, the speed control voltage is generated which and is raised or lowered in accordance with the time difference between the period of the speed signal detected from the motor and the standard time. The speed of the motor is feedback-controlled by the speed control voltage, and a voltage for restarting the motor, after it is once stopped, is applied to the feedback control loop.

With the provision of the starter, it is possible to restart the motor and resume the feedback control in accordance with the speed signal and the standard time, even if the motor is once stopped and the speed signal cannot be detected temporarily.

According to another aspect of the present invention, there is provided a motor speed regulating circuit which includes a speed signal generator for generating a speed signal having a frequency proportional to the speed of the motor, synchronously with the rotation of the motor, a signal processing circuit for converting the speed signal into a digital speed pulse signal alternately taking high and low level binary values, a counter for counting a predetermined standard time synchronously with one of the high and low levels of the speed pulse signal, an error detector for detecting a time difference between the period of the speed pulse signal and the predetermined standard time counted by the counter and outputting an error pulse signal having a pulse width corresponding to the time difference, a control voltage generator for generating a speed control voltage to be applied to the motor in accordance with the pulse width of the error pulse signal and feedback-controlling the speed of the motor in accordance with the standard time, and a starter for starting the motor after the motor is stopped.

There is a case wherein when a motor is to be started, the counter does not count clocks depending on the logical state (binary state) of the speed pulse signal after the motor is stopped, and therefore the error pulse signal corresponding to the time difference cannot be outputted from the error detector and the speed control signal is not supplied to the motor. Even in such a case, the starter forcibly generates the speed control voltage for the motor. Accordingly, the motor can be reliably started independent from the logical state (binary state) of the speed pulse signal after the motor is stopped.

With the circuit having a relatively small number of circuit elements including one counter for counting the standard time, it is possible to provide a high precision speed control of the motor and a reliable and smooth restart of the motor.

According to an example of the present invention, the starter includes a circuit for applying a start signal to a signal path of the speed control voltage to be applied to the motor by the control voltage generator, when a control signal for controlling an enabled/disabled operation of the motor speed regulating circuit takes a state of the enabled operation.

According to an example of the present invention, the starter includes a circuit for operating the control voltage generator to apply a start signal to the motor, when a control signal for controlling an enabled/disabled operation of the motor speed regulating circuit takes a state of the enabled operation.

According to still another aspect of the present invention, there is provided a storage medium drive which includes a motor for rotating a disk of storage medium, a read/write unit for performing at least data read and data write relative to the rotated disk, a speed signal generator for generating a speed signal having a frequency proportional to the speed of the motor, synchronously with the rotation of the motor, a time difference detector for detecting a time difference between the period of the speed signal and a predetermined standard time, a control voltage generator for generating a speed control voltage to be applied to the motor in accordance with the detected time difference and feedback-controlling the speed of the motor in accordance with the standard time, and a starter for starting the motor after the motor is stopped.

Accordingly, in storage medium drives such as HDDs and FDDs, the rotation of disks of storage medium can be reliably started with a simple circuit.

DESCRIPTION OF THE PREFERRED EMBODIMENTS

Figure 1:
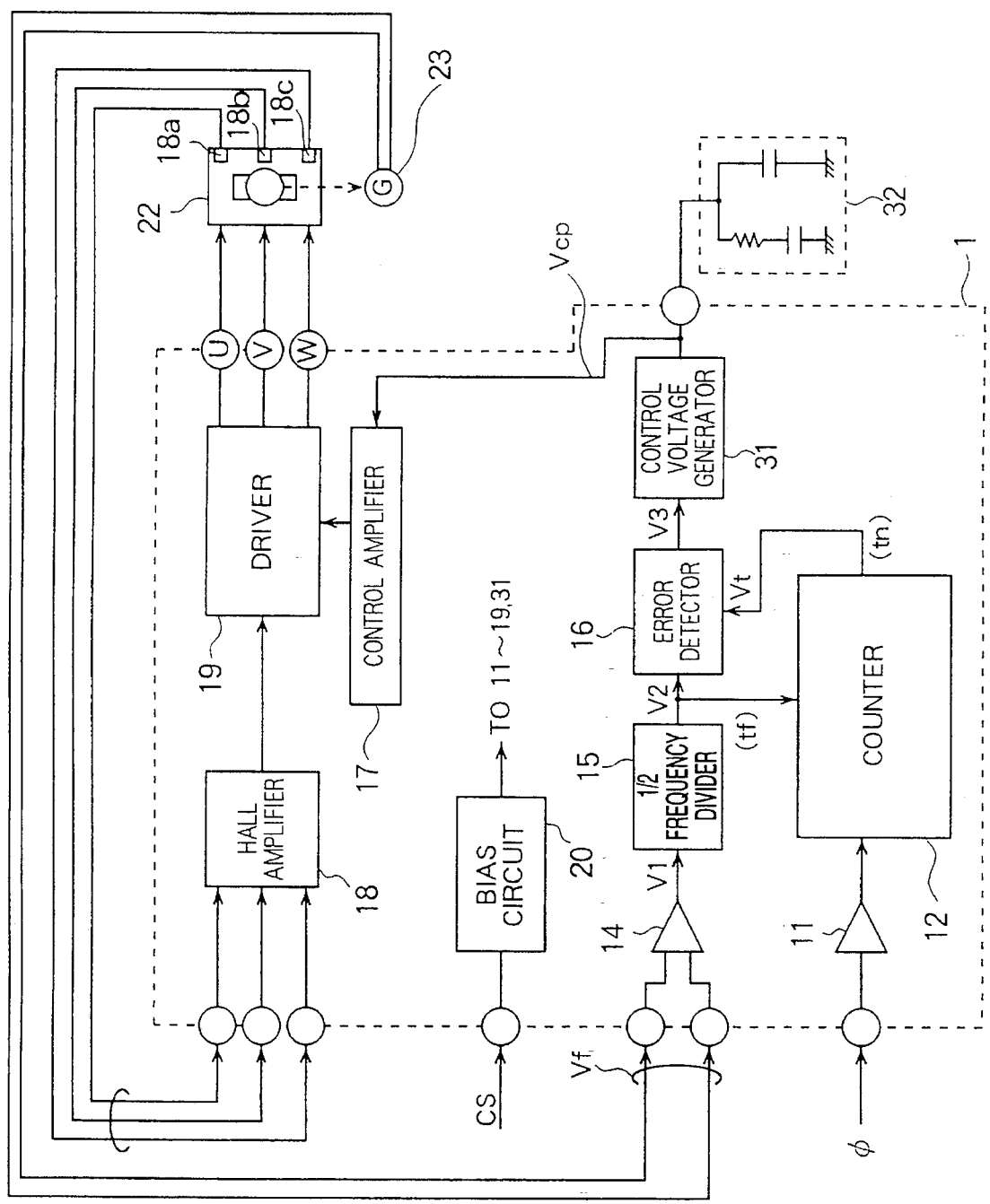
FIG. 1 is a block diagram showing an example of a motor speed regulating circuit proposed by the inventors of the present application.
Figure 2:
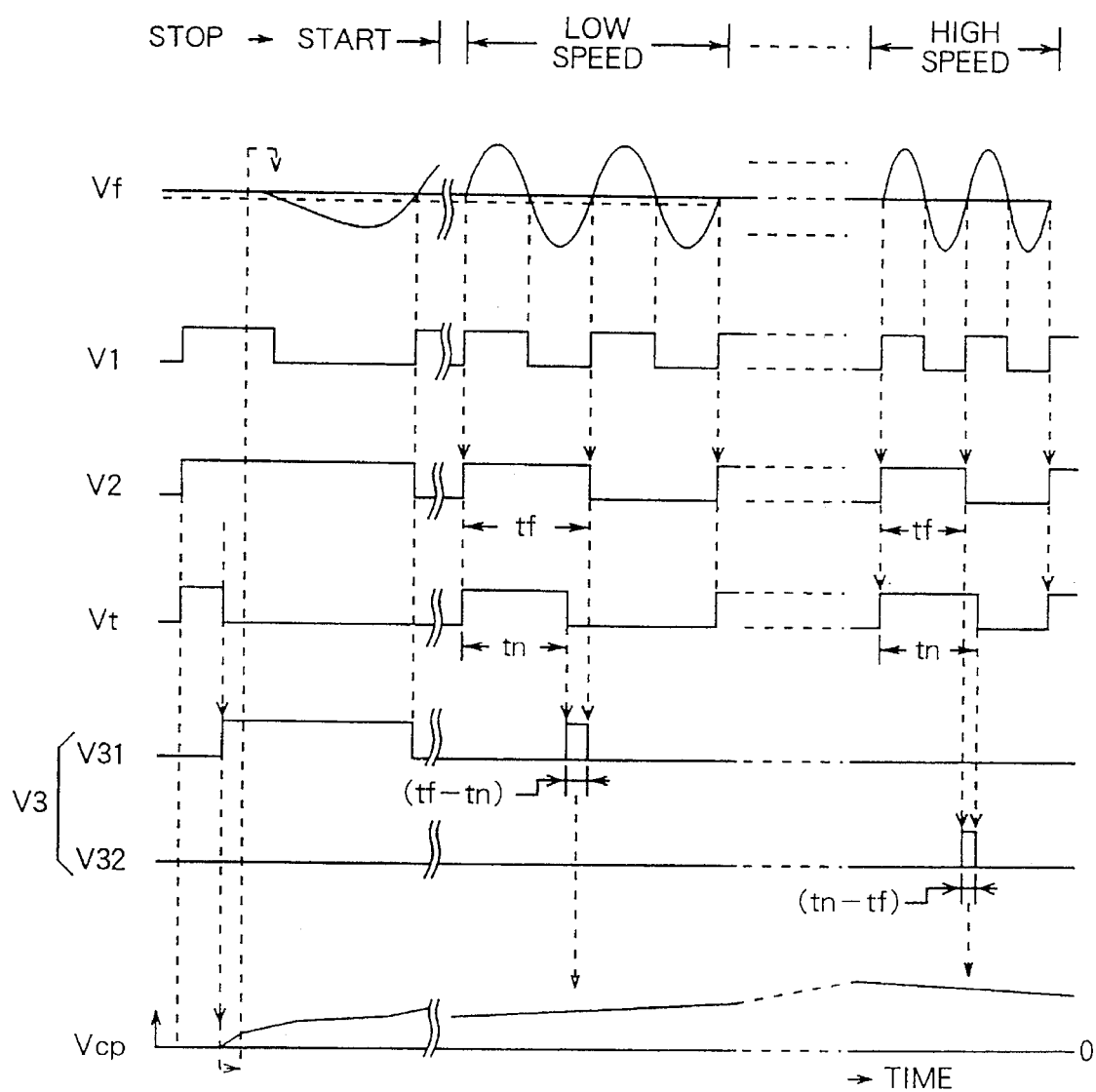
FIG. 2 is a timing chart of signal waveforms explaining an example of the operation of the motor speed regulating circuit shown in FIG. 1.

Embodiments of the motor speed regulating circuit and storage medium drive of the invention will be described with reference to the accompanying drawings.

In each drawing, elements represented by the same reference numerals have the same or similar function.

Figure 4:
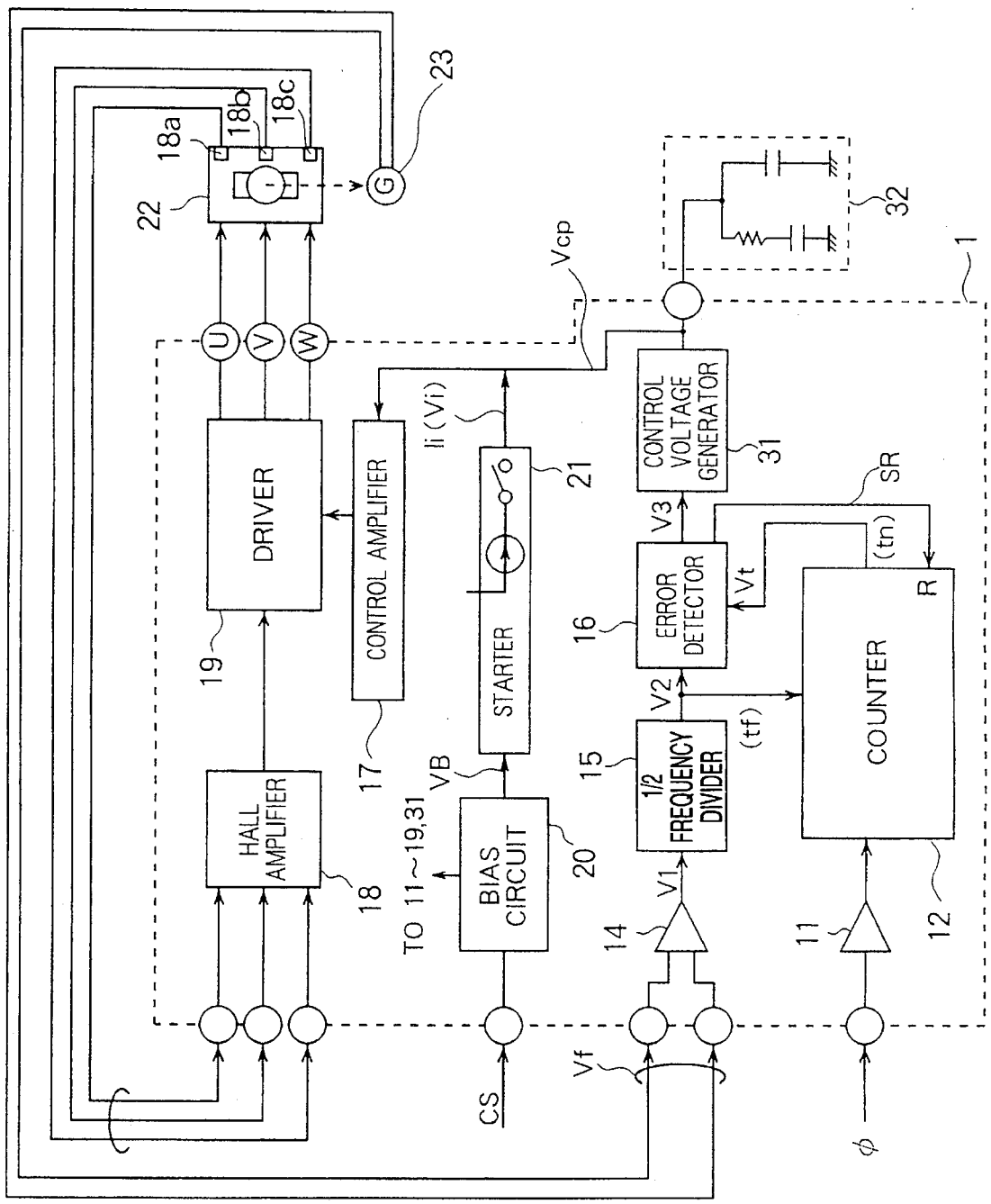
FIG. 4 is a block diagram of a motor speed regulating circuit according to a first embodiment of the invention.

FIG. 4 is a block diagram showing an embodiment of the motor speed regulating circuit of the invention.

The speed regulating circuit shown in FIG. 4 has an amplifier 11 constituting an input circuit for a main clock $\phi$, a counter 12 for determining a reference or standard time (tn) by counting a predetermined number n of main clocks $\phi$, a comparator 14, a ½ frequency divider 15, an error detector 16, a control amplifier 17, a circuit (Hall amplifier) 18 for detecting a rotation phase of a rotor, for example, in accordance with outputs of Hall sensors 18a to 18c, a motor driver 19 having a commutation control function and other functions, a bias circuit 20 for supplying a bias voltage VB for controlling the enabled/disabled operation of the speed regulating circuit, a starter 21, a tachometer generator 23 coupled to the output shaft of a motor 22 such as a three-phase brushless motor, a control voltage generator 31, and a time constant circuit 32. This embodiment has the starter 21 added to the circuit shown in FIG. 1.

The circuit elements 11 to 21, and 31 are integrally formed as a single semiconductor integrated circuit 1.

When a chip select signal supplied from the outside of the semiconductor integrated circuit 1 takes an active level (L), the bias circuit 20 generates and supplies the bias voltage VB to the circuit elements 11 to 21, and 31 to change the disabled operation where power is scarcely consumed, to the enabled operation of the circuit elements 11 to 21, and 31 of the semiconductor integrated circuit 1.

The tachometer generator 23 generates a rotation speed of the motor 22 as a function of frequency. A motor speed signal Vf detected by the tachometer generator 23 is supplied to the comparator 14 which compares the motor speed signal Vf with a predetermined level and forms a digital speed pulse signal V1 taking high (H) and low (L) binary logical levels.

The speed pulse signal V1 is changed to a speed pulse signal V2 having a frequency half that of the speed pulse signal V1, by the ½ frequency divider 15.

The counter 12 starts counting a predetermined standard time tn in response to the leading edge of the H level period of the speed pulse signal V2 having a frequency of one seconds that of the speed pulse signal V1, and continues to output the time pulse signal Vt for the standard time tn. The standard time tn is measured by counting a predetermined number n of main clock pulses $\phi$ in response to when the speed pulse signal V2 rises from L to H. When the standard time tn is counted, a signal $S_R$ is supplied in response to the completion of the counting of the time tn from the error detector 16 to the reset input terminal R of the counter 12 to reset the counter 12.

Figure 5:
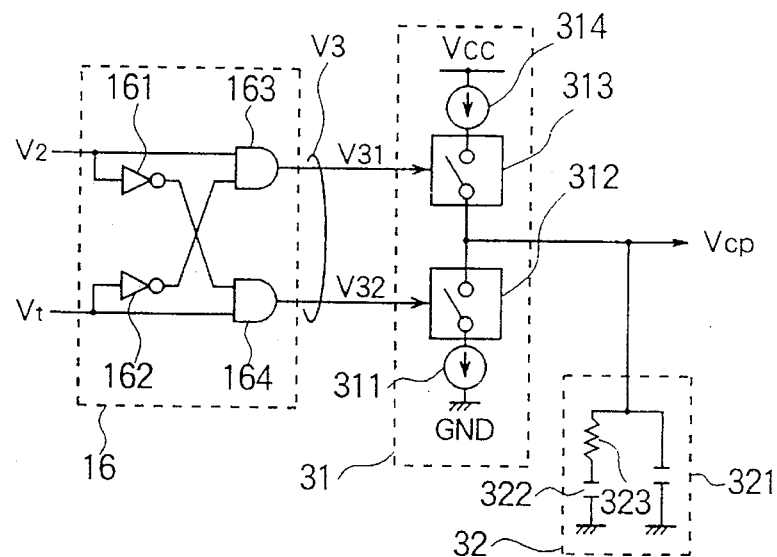
FIG. 5 is a circuit diagram showing an example of the structures of the error detector and the control voltage generator shown in FIG. 4.

As an example of the detailed structure of the error detector 16 is shown in FIG. 5, it is formed by inverters 161 and 162 and AND gates 163 and 164. The error detector 16 detects a time difference between the speed pulse signal V2 and the time pulse signal Vt, and outputs an error pulse signal V3 representing the detected time difference. In this case, if the motor 22 is at a low speed and the H level period tf of the speed pulse signal V2 is longer than the standard time tn (tn<tf), then a first error pulse V31 having the pulse width (tf−tn) is outputted. On the other hand, if the motor 22 is at a high speed and the H level period tf of the speed pulse signal V2 is shorter than the standard time tn (tf<tn), then a second error pulse V32 having the pulse width (tn−tf) is outputted.

Figure 12:
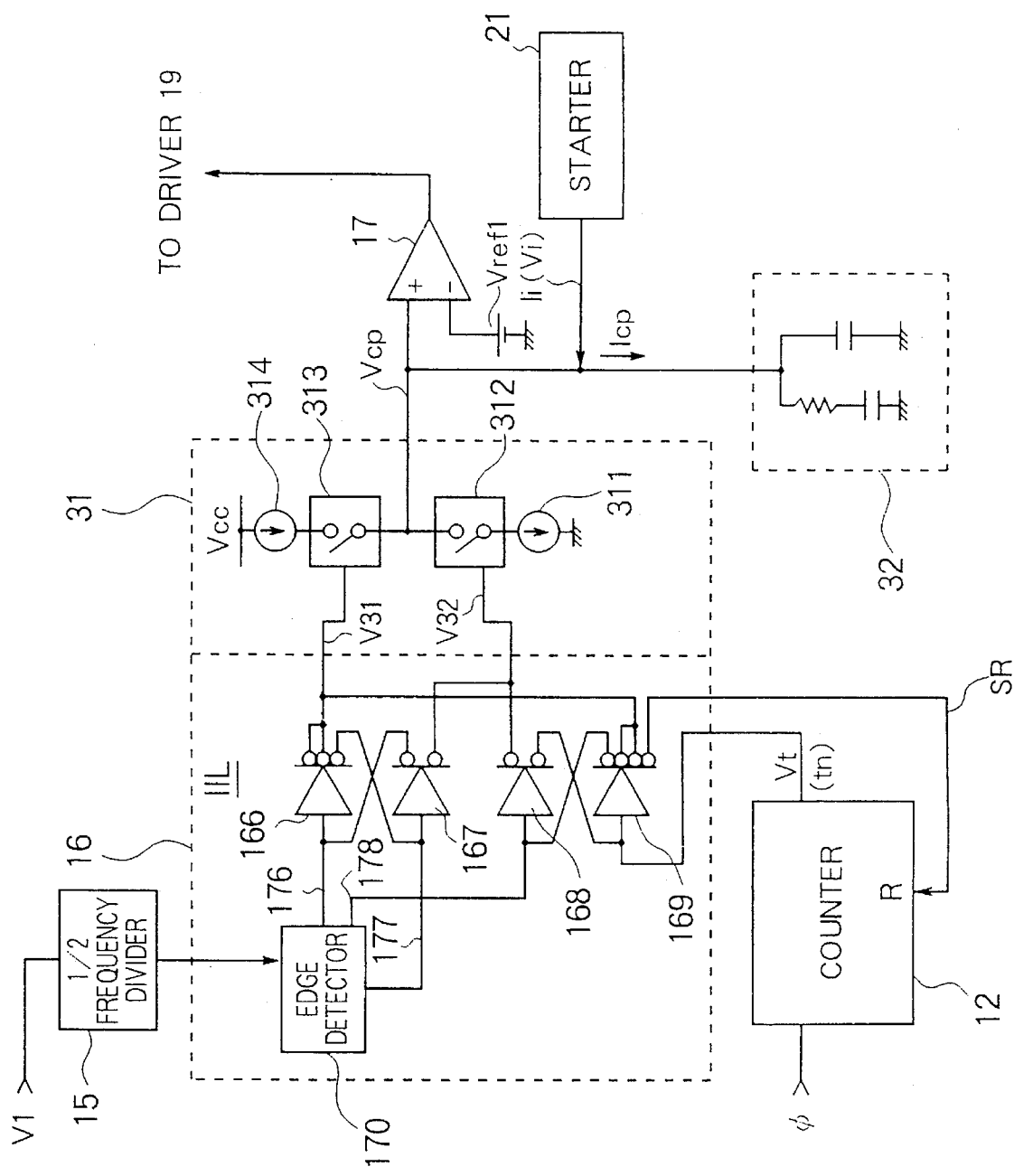
FIG. 12 is a circuit diagram showing another example of the structure of the error detector shown in FIG. 4.

A reset signal is applied from the error detector 16 to the reset input terminal R off the counter 12. The reset signal may be generated by a circuit having the structure such as shown in FIG. 12 including IIL 166 to 169 circuit elements. The reset signal takes a high level in response to a fall of the pulse signal Vt which becomes low level in response to the completion of the counting of the time tn. In response to this high level signal, the counter 12 is reset and stops counting. In this case, therefore, the signal V2 need not be supplied to the counter 12.

As an example of the detailed structure of the control voltage generator 31 is shown in FIG. 5, it is formed by a charge pump circuit having switching circuits 312 and 313 made of active elements such as MOS switches and constant current sources 311 and 314. The switching circuits 312 and 313 are turned on when the error pulse signals V31 and V32 take, for example, a high level. The capacitor circuit (time constant circuit) 32 is externally connected to the control voltage generator 31, and is formed, for example, by capacitors 321 and 322 and a resistor 323. When the first error pulse signal V31 is inputted, the switching circuit 313 of the control voltage generator 31 turns on for the time period corresponding to the pulse width (tf–tn) and flows a charge current Icp to charge the capacitor circuit 32, whereas when the second pulse signal V32 is inputted, the switching circuit 312 turns on for the time period corresponding to the pulse width (tn–tf) to discharge the capacitor circuit 32. Therefore, a voltage across a capacitor of the capacitor circuit 32 is raised or lowered in accordance with an actual motor speed detected as a difference from a standard motor speed corresponding to the standard time tn. This voltage of the capacitor circuit 32 is supplied via the control amplifier 17 to the driver 19 as a speed control voltage Vcp for the motor 22. In FIG. 5 and other drawings, Vcc represents a power source potential, and GND represents a ground potential.

The driver 19 drives the motor by a drive power determined by the speed control voltage Vcp. As the speed control voltage Vcp is raised, a drive power for the motor 22 is increased to accelerate the motor 22. On the contrary, as the speed control voltage Vcp is lowered, a drive power for the motor 22 is reduced to decelerate the motor 22.

In the above manner, a feedback control loop is realized for controlling the speed of the motor 22 in accordance with the standard time tn generated by the counter 12 and the speed signal Vf detected from the motor 23.

Figure 6:
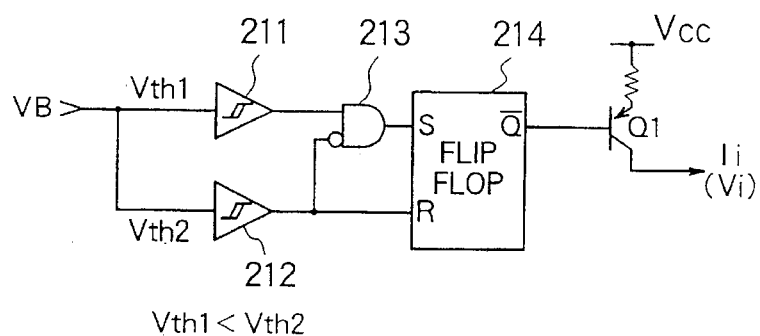
FIG. 6 is a circuit diagram showing an example of the structure of the starter shown in FIG. 4.

An example of the detailed structure of the starter 21 is shown in FIG. 6. It is formed by first and second level detectors 211 and 212, an AND gate 213 with a logical NOT input terminal, an RS (reset/set) flip-flop 214, and an output transistor Q1.

Figure 7:
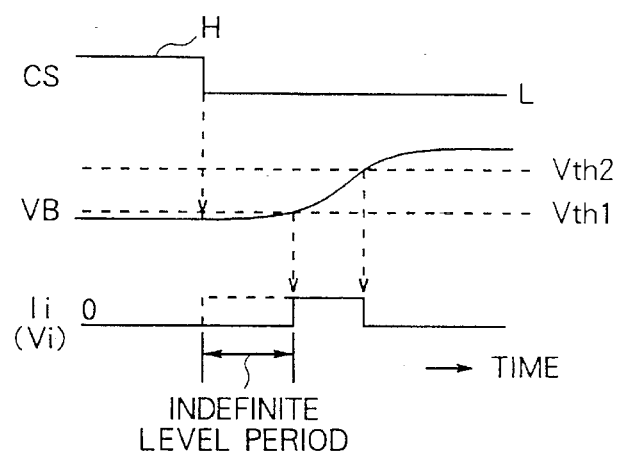
FIG. 7 shows signal waveforms explaining the operation of the starter shown in FIG. 6.

As shown in FIG. 7, in operation, when the chip select signal CS takes an active level, the level of the bias voltage VB outputted from the bias circuit 20 gradually rises and exceeds a detection threshold value Vth1 of the first level detector 211 and thereafter reaches a detection threshold value Vth2 of the second level detector 212. During this period from when the level exceeds the threshold value Vth1 to when it reaches the threshold value Vth2, a set output (Q) of the flip-flop 214 is supplied to the base of the transistor Q1 which in turn supplies a start current Ii (start voltage Vi).

As described earlier, when the chip select signal CD supplied from the outside of the semiconductor integrated circuit 1 takes an active level (L), the bias circuit 20 generates and supplies the bias voltage VB to the circuit elements 11 to 21, and 31 to change the disabled operation where power is scarcely consumed, to the enabled operation of the circuit elements 11 to 21, and 31 of the semiconductor integrated circuit 1.

Therefore, when the chip select signal CS for controlling the enabled/disabled operation takes the active level (L), the starter 21 temporarily supplies a start current Ii to the signal path of the motor speed control voltage Vc in the feedback control loop. In this manner, the motor 22 can be restarted.

Figure 3:
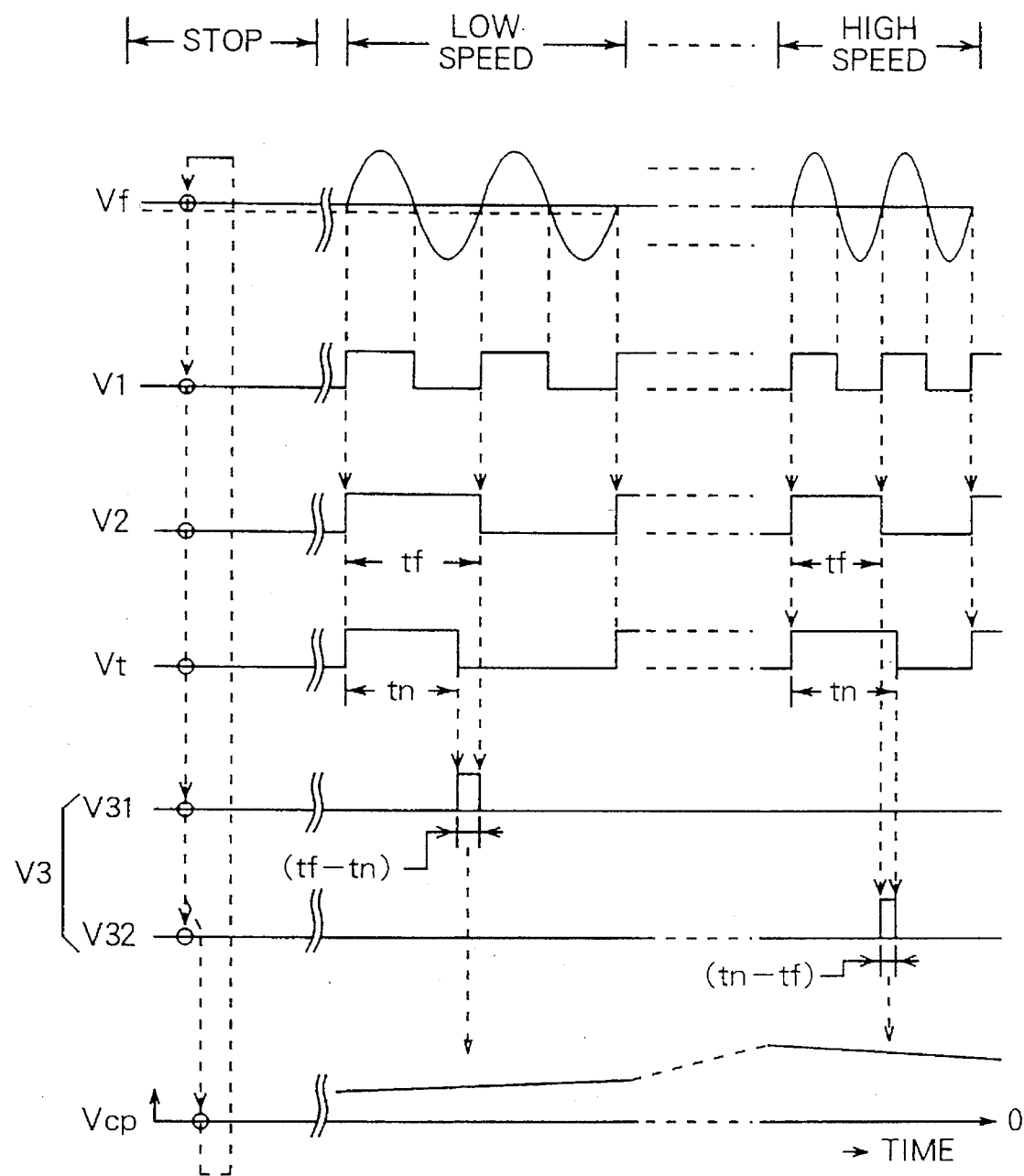
FIG. 3 is a timing chart of signal waveforms explaining another example of the operation of the motor speed regulating circuit shown in FIG. 1.
Figure 8:
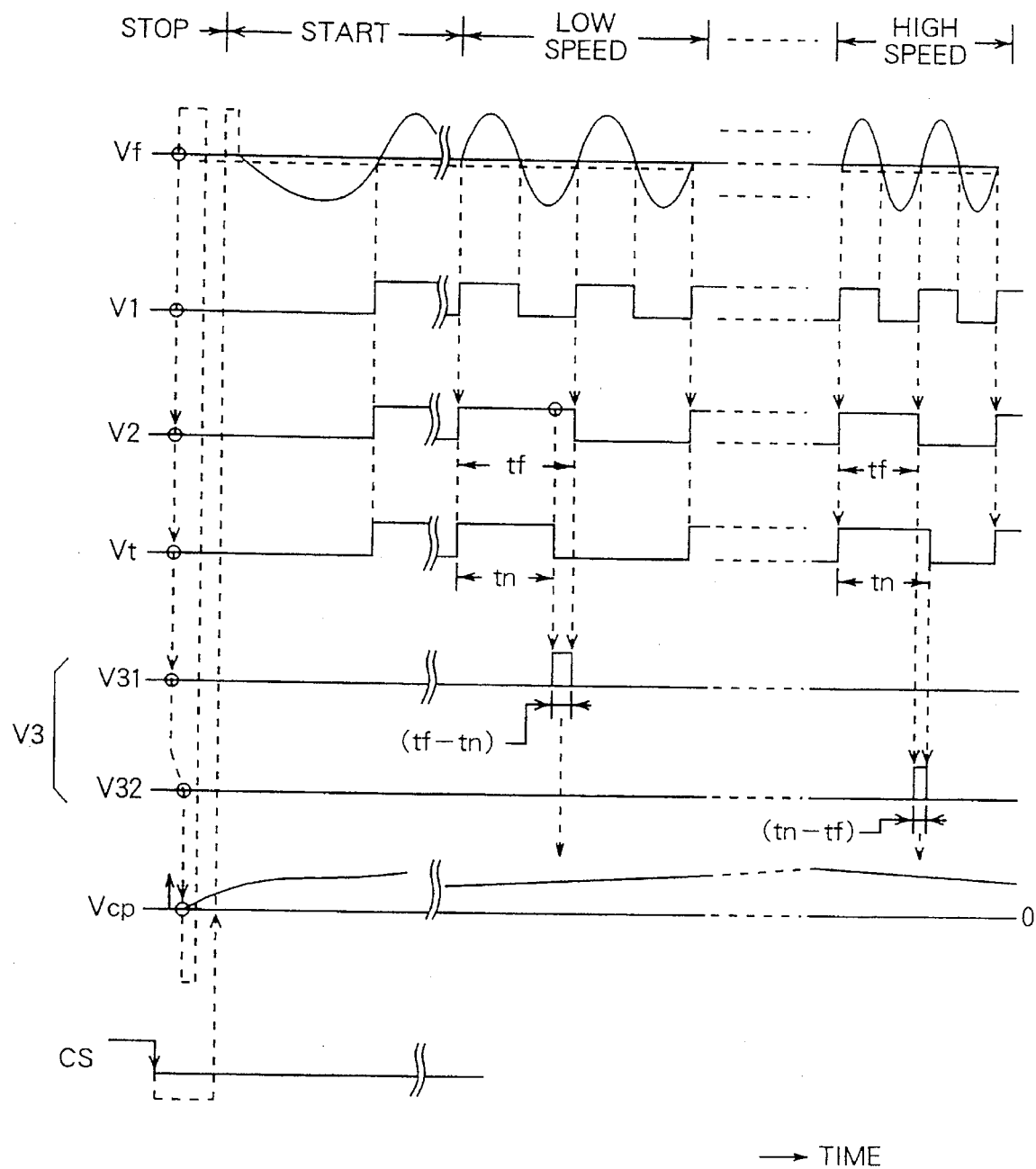
FIG. 8 is a timing chart of signal waveforms explaining an example of the operation of the motor speed regulating circuit shown in FIG. 4.

FIG. 8 is a timing chart of signal waveforms briefly explaining the operation of the motor speed regulating circuit (FIG. 3).

First, a normal operation of the motor 22 will be described.

Referring to FIG. 8, as the rotation speed of the motor 22 becomes lower than the standard speed, the period of the speed signal Vf detected from the motor becomes longer and the H level period tf of the speed pulse signal V2 obtained from the speed signal Vf becomes longer than the H level period tn of the time pulse signal Vt (tf>tn). In this case, the first error pulse signal V31 having a pulse width corresponding to the time difference (tf–tn) is outputted to raise the speed control voltage Vcp.

On the contrary, as the rotation speed of the motor 22 becomes higher than the standard speed, the period of the speed signal Vf detected from the motor becomes shorter and the H level period tf of the speed pulse signal V2 obtained from the speed signal Vf becomes shorter than the H level period tn of the time pulse signal Vt (tn>tf). In this case, the second error pulse signal V32 having a pulse width corresponding to the time difference (tn–tf) is outputted to lower the speed control voltage Vcp.

In the above manner, the rotation speed of the motor 22 is subjected to the feedback control so as to make the H level period tf of the speed pulse signal V2 equal to the H level period tn of the time pulse signal Vt.

Next, the operation of stopping and restarting the motor will be described.

When the chip select signal CS is set to an inactive level (H), the semiconductor integrated circuit 1 enters a disabled state where the circuit scarcely consumes a power, and the motor 22 is stopped. Without the starter 21, even if the chip select signal CS is set to the active level (L) to resume the enabled state of the semiconductor integrated circuit 1, the speed signal Vf cannot not be detected from the motor 22 once stopped and the speed control voltage Vcp corresponding to the speed signal Vf may be not be outputted, so that the motor 22 remains stopped. This case will probably occur for one second depending upon the output logical state of the ½ frequency divider 15.

However, with the starter 21, when the chip select signal CS is set to the active level (L), the bias circuit 20 starts outputting the bias voltage VB. During the period the bias voltage takes a value between the two threshold values Vth1 and Vth2, the starter 21 applies the start current Ii to the signal path of the speed control voltage Vcp so that the motor 22 is driven. After the motor 22 is once rotated, the speed signal Vf can be detected so that the motor 22 continues to rotate under the feedback control in accordance with the speed control signal Vcp corresponding to the speed signal Vf.

As described above, even if the motor 22 is stopped once and the speed signal Vf cannot be detected, it is possible to restart the motor 22 and perform the feedback control in accordance with the speed signal Vf and the standard time tn. With the circuit having a relatively small number of circuit elements including one counter 12 for counting the standard time tn, it is possible to provide a high precision speed control of the motor 22 and a reliable and smooth restart of the motor 22.

Figure 9:
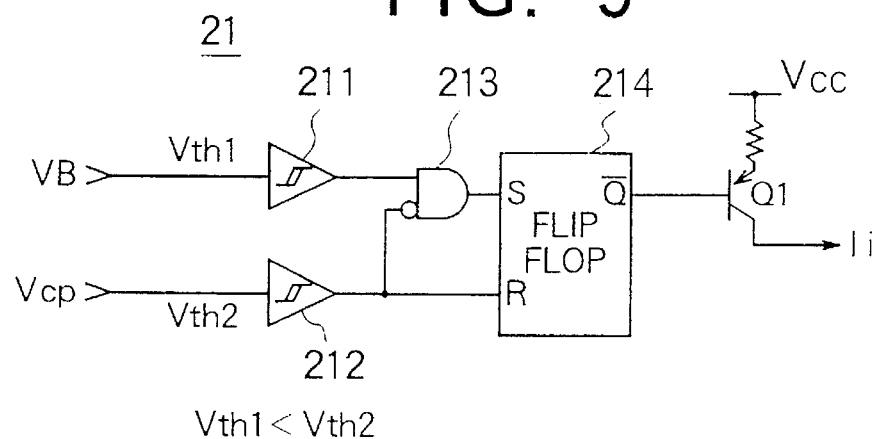
FIG. 9 is a circuit diagram showing another example of the structure of the starter shown in FIG. 4.

FIG. 9 shows another example of the structure of the starter 21.

Similar to the starter 21 shown in FIG. 6, a starter 21 shown in FIG. 9 is formed by first and second level detectors 211 and 212, an AND gate 213 with a logical NOT input terminal, an RS (reset/set) flip-flop 214, and an output transistor Q1. However, as a signal source for determining an output timing of the start current Vi, in addition to the bias voltage VB from the bias circuit 20, the speed control voltage Vcp from the control voltage generator 31 is used.

Specifically, the first level detector 211 detects whether the level of the bias voltage VB outputted from the bias circuit 20 exceeds the first threshold value Vth1. The start current Ii is outputted when the level exceeds the first threshold value Vth1.

The second level detector 212 detects whether the level of speed control voltage Vcp from the control voltage generator 31 exceeds the second threshold value Vth2 (Vth2>Vth1). An output of the start current Ii is stopped when the level exceeds the second threshold value Vth2.

In this manner, the motor 22 can be more reliably restarted because the start current Ii is supplied until the speed control voltage Vcp corresponding to the speed signal Vf takes a value sufficient for the speed feedback control.

Figure 10:
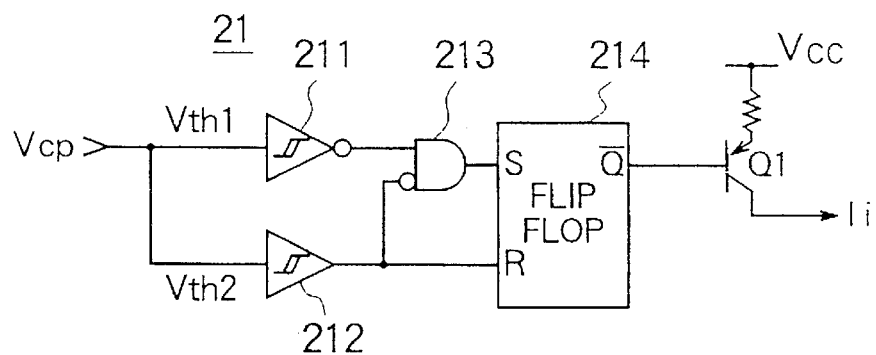
FIG. 10 is a circuit diagram showing a further example of the structure of the starter shown in FIG. 4.

FIG. 10 shows another example of the structure of the starter 21.

Similar to the starters 21 shown in FIGS. 6 and 9, a starter 21 shown in FIG. 10 is formed by first and second level detectors 211 and 212, an AND gate 213 with a logical NOT input terminal, an RS (reset/set) flip-flop 214, and an output transistor Q1. The restart operation of the starter 21 after the motor is once stopped is the same as the starter shown in FIG. 6 with the operation explained with FIG. 7.

In the starter 21 shown in FIG. 10, the first level detector 211 outputs a high level when the input level is lower than a detection threshold value. The input terminals of the first and second level detectors 211 and 212 are connected together and supplied with the speed control voltage Vcp.

Figure 11:
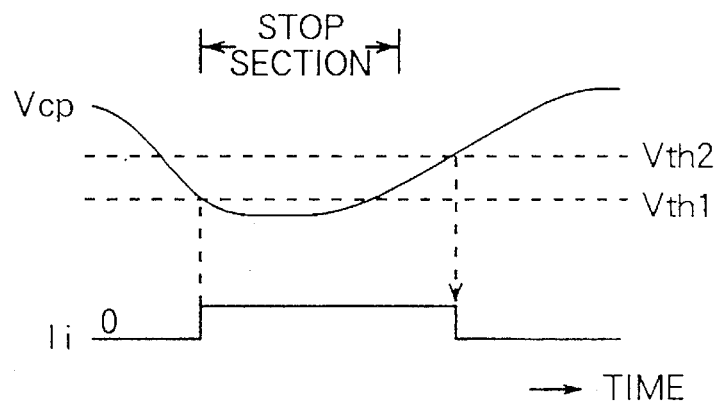
FIG. 11 shows signal waveforms explaining the operation of the starter shown in FIG. 10.

As shown in FIG. 11, when the speed control voltage Vcp becomes lower than the detection threshold value Vth1 of the first level detector 211 during the rotation of the motor, for example because of a rapid increase of a load, the flip-flop is set to start the supply of the start current Ii. Therefore, even if the motor stops, it is restarted by the start voltage Vi. When the speed control voltage Vcp exceeds the detection threshold value Vth2 of the second level detector 212, the flip-flop 214 is reset to stop outputting the start current Ii. Thereafter, the motor is driven in accordance with the voltage at the capacitor circuit 32 charged by the control voltage generator 31. Therefore, even if the motor 22 is stopped by some reason (e.g., increased load) other than the inactive level (H) of the chip select signal CS, it can be reliably restarted.

FIG. 12 shows an example of the structure of the error detector 16 formed by integrated injection logic (IIL) elements.

Referring to FIG. 12, the error detection logic is realized by IIL elements 166 to 169 and an edge detector 170. The IIL elements 166 to 169 are logic elements having a bipolar transistor structure. IIL elements provide a wired logic by interconnecting output terminals, and are efficient for high integration and low power consumption. Moreover, if IIL elements as well as power bipolar transistors of the driver of the motor 22 are formed as a single semiconductor integrated circuit, most of the semiconductor integrated circuit manufacturing processes are used in common.

The edge detector 170 outputs pulses to signal lines 176 and 178 in response to, for example, a rise of the pulse signal V2 supplied from the ½ frequency divider 15, and outputs a pulse to a signal line 177 in response to a fall of the pulse signal V2. The output signal Vt of the counter 12 is inputted to the IIL element 169, one output signal $S_R$ of the IIL element 169 is supplied to the reset terminal R of the counter 12. This signal supplied to the reset terminal R is a rise signal of the signal V2. The counter 12 performs a count operation when one output of the IIL element 169 forms, for example, a rise signal of the signal V2, and is reset when the output forms a fall signal of the signal Vt. In this case, the signal V2 is not required to be directly supplied to the counter 12.

In the example shown in FIG. 12, a differential amplifier is used for the control amplifier 17 which supplies the speed control voltage Vcp to the driver 19. The non-inverting input terminal of the differential amplifier 17 is connected to the capacitor circuit 32 so that the speed control signal Vcp is supplied in the same phase to the driver 19. The inverting input terminal is supplied with a constant reference voltage Vref1.

An output of the starter 21 may be supplied as an output (non-inverting input terminal of the control amplifier 17) of the capacitor circuit 32 as shown in FIG. 12, or may be supplied as an output of the control circuit 17. In either case, the motor is restarted by the start current Ii supplied from the starter 21.

When the speed control voltage Vcp supplied to the non-inverting terminal of the differential control amplifier 17 becomes lower than the reference voltage Vref1, an output voltage of the control amplifier 17 becomes 0 V and the motor stops. However, when the chip select signal CS supplied to the semiconductor integrated circuit 1 takes the low level (L), the starter 21 outputs the start current Ii to flow a charge current Icp to the capacitor circuit 32. Therefore, the capacitor circuit 32 is quickly charged and the speed control voltage Vcp at the non-inverting input terminal of the control amplifier 17 exceeds the reference voltage Vref1 and supplied to the driver 19 to restart the motor 22.

Figure 13:
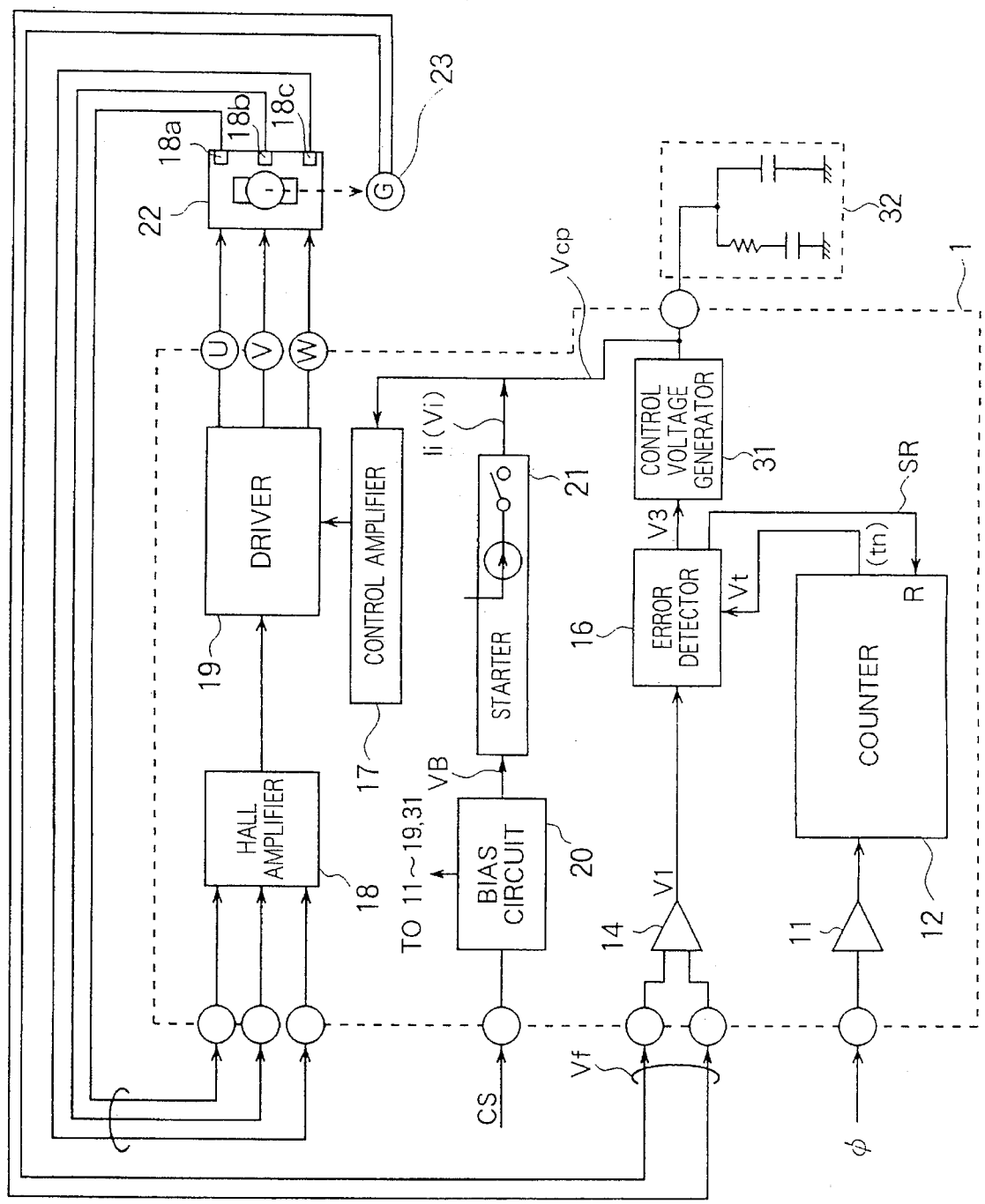
FIG. 13 is a block diagram of a motor speed regulating circuit according to a second embodiment of the invention.
Figure 14:
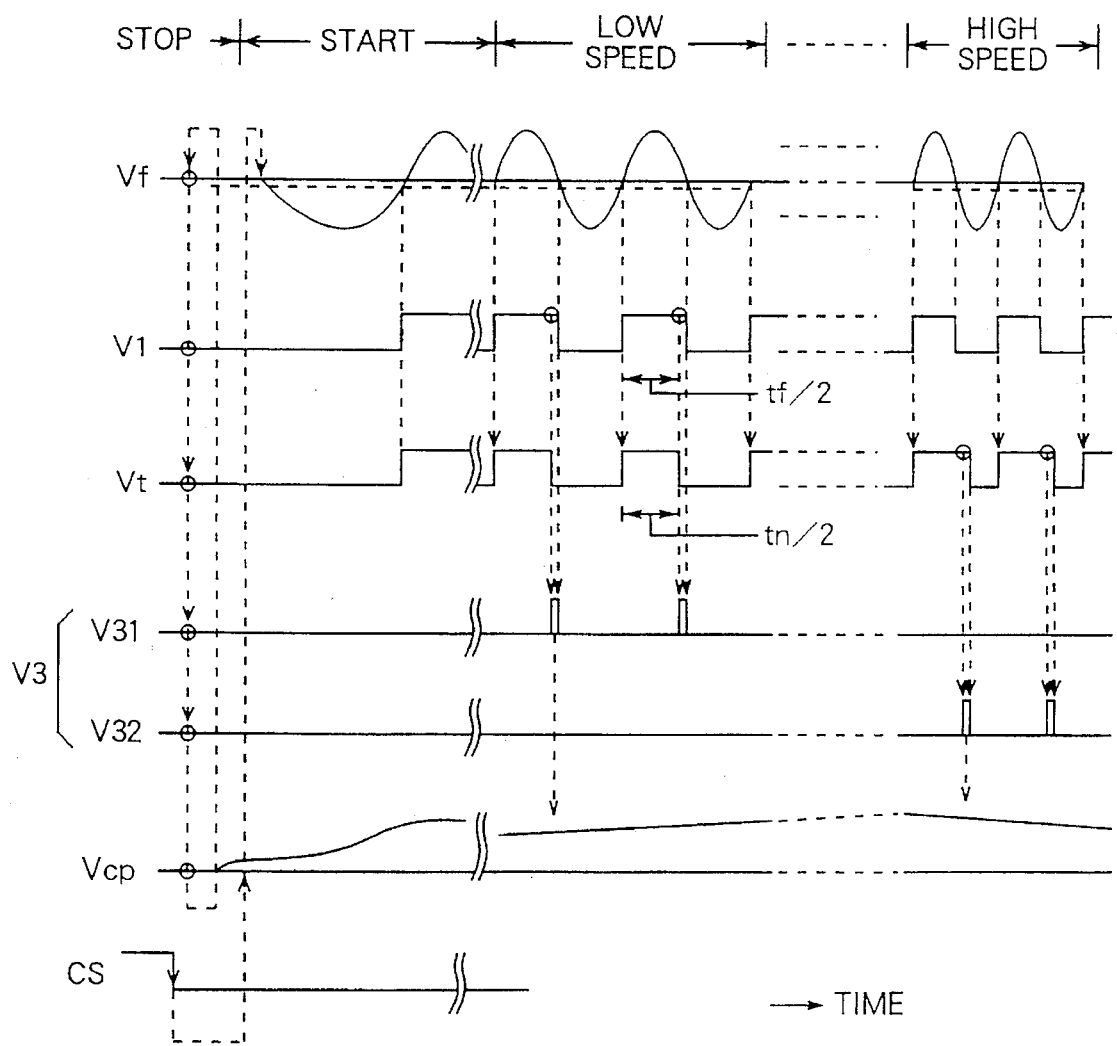
FIG. 14 is a timing chart of signal waveforms explaining an example of the operation of the motor speed regulating circuit shown in FIG. 13.

FIG. 13 shows an example of the structure of the speed regulating circuit according to the second embodiment of the invention, and FIG. 14 is a timing chart of signal waveforms explaining the operation of the speed regulating circuit of the second embodiment. A different point of the second embodiment from the first embodiment is as follows. The speed pulse signal V1 obtained by the comparator which compares the speed signal Vf detected as a function of frequency, is compared with a standard time tn/2 counted by the counter 12. Specifically, the H level period (tf/2=a half of the H level period tf of the speed pulse signal V2) is compared with the standard time tn/2 counted by the counter 12 to obtain an error pulse signal V3 (V31, V32) for the feedback control.

In this embodiment, therefore, the ½ frequency divider 15 shown in FIG. 4 is not necessary, and as the reset signal $S_R$ the fall signal of the signal Vt is used.

If both the fall and rise edges of the speed signal V1 are detected, a speed signal having a constant duty ratio can be generated.

Also in this embodiment, with the starter 21, it becomes possible to provide a high precision speed control of the motor 22 and a reliable and smooth restart of the motor 22.

Figure 15:
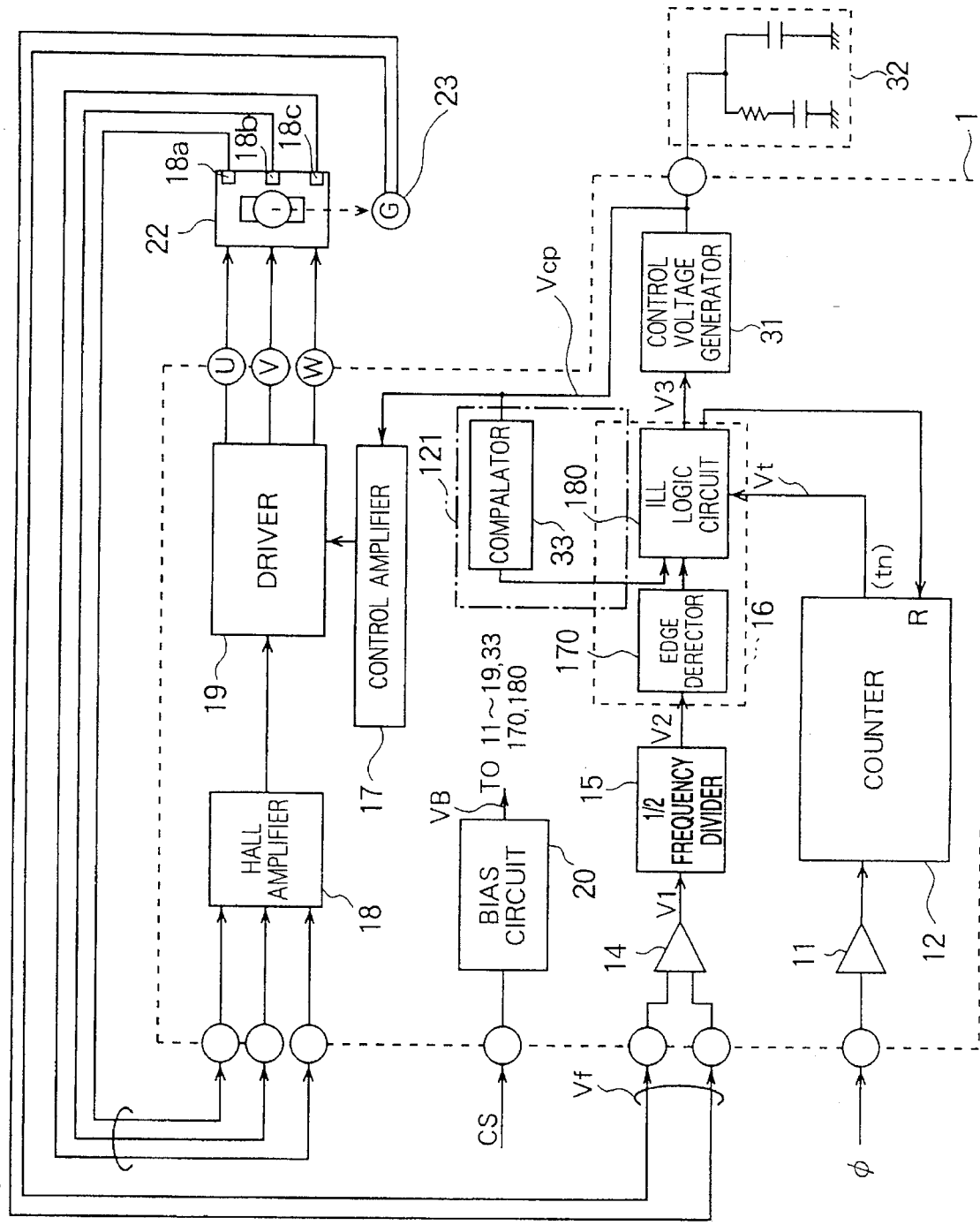
FIG. 15 is a block diagram of a motor speed regulating circuit according to a third embodiment of the invention.
Figure 16:
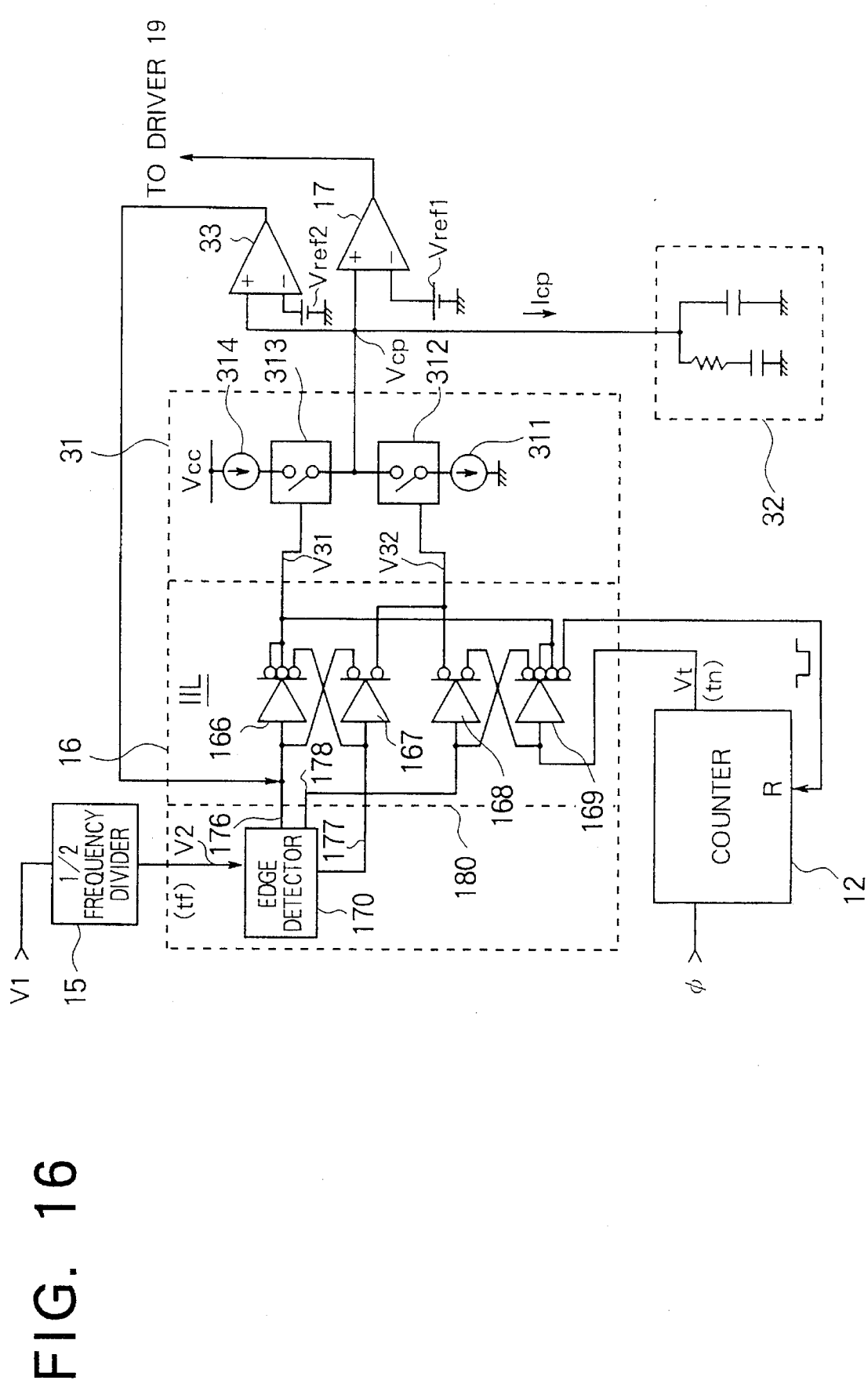
FIG. 16 is a circuit diagram showing the detailed structure of the starter and other circuits shown in FIG. 15.

FIG. 15 shows the structure of the speed regulating circuit according to the third embodiment of the invention, and FIG. 16 shows the detailed structure of the starter and its peripheral circuits. In this embodiment, the starters 21 of the first and second embodiments are replaced by a starter 121 which is formed by a comparator 33, a control voltage generator 31, a capacitor circuit 32, and a fraction of an error detector logic circuit 16. The control voltage generator 31, capacitor circuit 32, and error detector logic circuit 16 are commonly used by the starter 121 and the speed control voltage Vcp generator 31. The structure of the error detector logic circuit 16 may be the same as FIG. 12 and the circuit 16 is formed by an edge detector 170 and an IIL logic circuit 180. The comparator 33 is supplied with an output of the capacitor circuit 32 at its non-inverting input terminal, and a reference voltage Vref2 is supplied to its inverting input terminal, where Vref1>Vref2.

Figure 17:
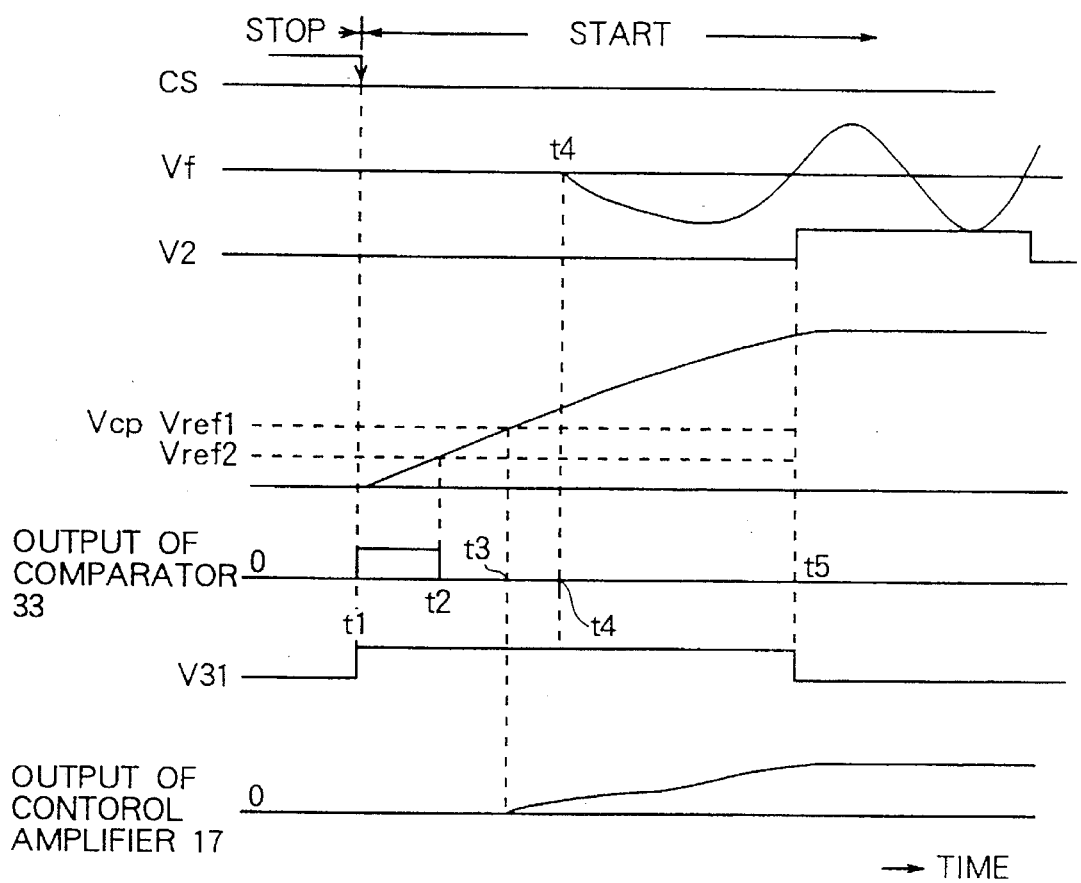
FIG. 17 is a timing chart of signal waveforms explaining an example of the operation of the motor speed regulating circuit shown in FIG. 15.

The operation of restarting the motor of this embodiment will be described with reference to the timing chart shown in FIG. 17.

When the chip select signal CS takes a low level (time t1) under the condition that the motor 22 is in a halt, the comparator 33 compares the voltage Vcp at its non-inverting input terminal with the reference voltage Vref2. In this case, the voltage Vcp is lower than Vref2 so that an output of the comparator 33 takes a high level. An output of the comparator 33 is supplied to an IIL element 166 so that the signal V31 takes a high level to turn on a switching circuit 313. As a result current flows from a constant current source 314 to the capacitor circuit 32 via the switching circuit 313 to charge the capacitor circuit 32. An output voltage Vcp of the capacitor circuit 32 gradually rises and when it reaches the reference voltage Vref2 (time t2), an output of the comparator 33 takes a low level. However, since IIL elements 166 and 167 constitute a latch, the signal V31 continues to be outputted even if the output of the comparator 33 takes the low level, and the voltage Vcp continues to rise. When the voltage Vcp reaches and exceeds the reference voltage Vref1 (time t3), an output of the control amplifier 17 gradually rises. As a result, the motor 22 is thereafter restarted (time t4) and the tachometer generator 23 generates the motor speed signal Vf. The speed pulse signal V1 changing from a high level to a low level or vice versa is therefore generated in accordance with the motor speed signal Vf. Therefore, as in the example shown in FIG. 17, even if the speed pulse signal V2 takes the low level after the motor is stopped, it takes the high level (time t5) following a change in the level of the signal V1. As the signal V2 takes the high level and the edge detector 170 outputs a pulse to a signal line 176, the signal V31 takes a low level. However, as the signal V2 takes the high level, the reset state of the counter 12 is released by a signal supplied from one output of the IIL element 169 to the reset terminal R of the counter 12. The counter 12 starts counting to resume the normal speed control in accordance with a comparison between the count (standard time) tn by the counter 12 and the H level period tf. Therefore, the speed of the motor increases toward the standard speed corresponding to the standard time tn.

In this manner, also in this embodiment, the motor can be reliably restarted irrespective of the logical state of the signal V2.

Also in this embodiment, similar to the second embodiment, the speed control may be performed based upon a comparison between the standard time tn/2 and the H level logical time tf/2.

Figure 18:
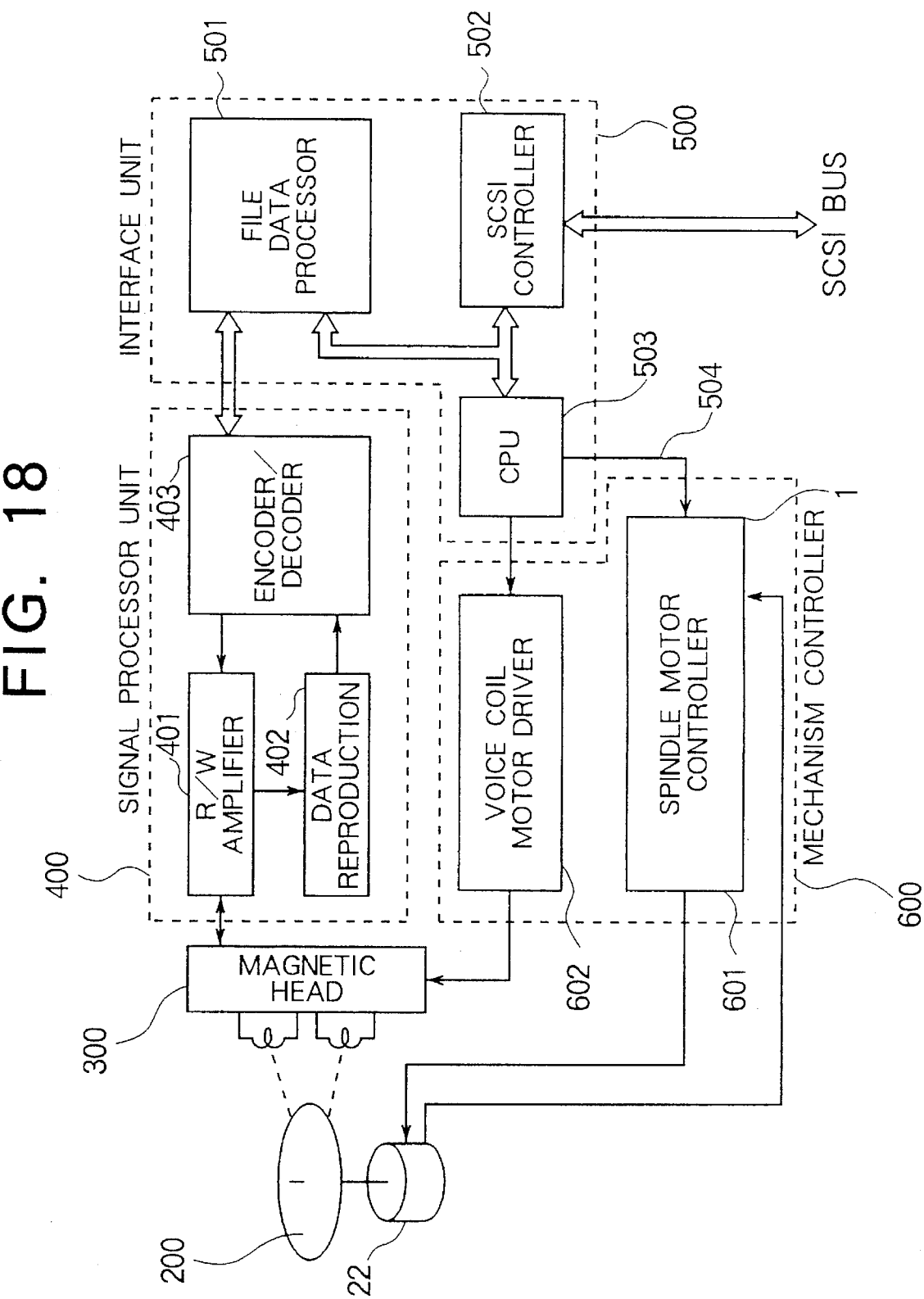
FIG. 18 is a block diagram showing an example of a hard disk drive to which the motor speed regulating circuit of the invention is applied.

FIG. 18 is a block diagram showing a storage medium drive to which the motor speed regulating circuit of this invention is applied.

The storage medium drive shown in FIG. 18 is a hard disk drive (HDD) using a magnetic disk as a storage medium. This drive is constituted by a magnetic head 300 for reading/writing data relative to a magnetic disk 200 rotated by a spindle motor 22, a signal processor unit 400 for processing read/write data, an interface unit 500 for interfacing with an external circuit to transfer read/write data, and a mechanism drive unit 600 for driving the motor 22 and the magnetic head 300. In the mechanism drive unit 600, the motor speed regulating circuit 1 of any one of the above-described embodiments is assembled as a spindle motor controller 601 for the speed and restart control of the motor 22.

With this storage medium drive, the motor 22 which consumes most of powers of the drive can be restarted reliably and smoothly after it is once stopped. Therefore, power can be conserved considerably by stopping the motor 22 when unnecessary.

In FIG. 18, the signal processor unit 400 includes a read/write (R/W) amplifier 401, a data reproduction circuit 402, an encoder/decoder 403, and other necessary circuits. The interface unit 500 includes a file data processor 501, a SCSI (small computer system interface) controller 502 connected to an external system via a SCSI bus, a CPU (central processing unit) 503, and other necessary circuits. The mechanism control unit 600 includes the motor speed controller 601, and a voice coil motor driver 602 for driving the magnetic head 300.

CPU 503 instructs the spindle motor controller 601 to change the motor speed, by supplying a control signal via a signal line 504, supplies a chip select signal CS to the spindle motor controller 601 in response to a turn-on or the like of a power switch (not shown), and performs other necessary controls. A speed change is performed by setting the standard time counted by the counter 12 of the motor speed regulating circuit 1 to another value.

In this HDD, the function of the counter 12 may be performed by CPU 503 to omit the counter 12 of the spindle motor controller 601.

Figure 19:
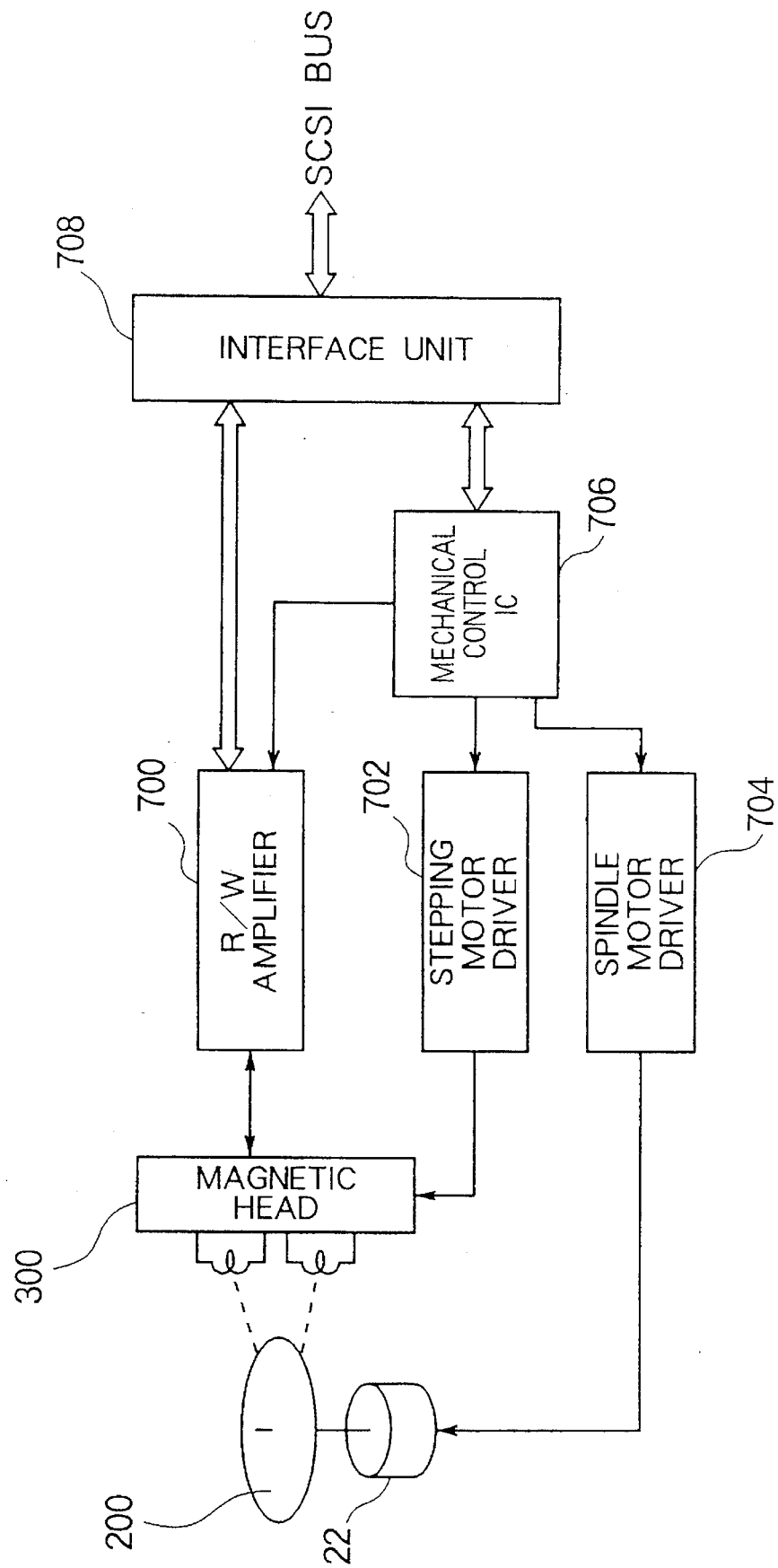
FIG. 19 is a block diagram showing an example of a floppy disk drive to which the motor speed regulating circuit of the invention is applied.

FIG. 19 is a block diagram showing the structure of a floppy disk drive (FDD) to which the motor speed regulating circuit of this invention is applied. In this FDD, a magnetic head 300 is driven by a stepping motor driver 702 for driving a stepping motor (not shown). Read/write data of the magnetic head 300 is transferred to and from an interface unit 708 via a read/write amplifier 700. The interface unit 708 is connected to an external system via a SCSI bus.

The motor speed regulating circuit 1 of any one of the above-described embodiments is assembled as a spindle motor controller 704. The spindle motor controller 704 and the stepping motor driver 702 are controlled by a mechanical control IC 706. The mechanical control IC 706 has a CPU which instructs the spindle motor controller 704 to change the motor speed, supplies a chip select signal CS to the spindle motor controller 601 in response to a turn-on or the like of a power switch (not shown), and performs other necessary controls. A speed change is performed in the manner similar to the HDD described above. In this FDD, a counter 12 for counting a standard time is provided in the spindle motor controller 704, and only a single counter for counting the standard time is effectively used as in the case of the above-described embodiments.

The embodiments of the invention made by the present inventors have been described in detail. The invention is not limited only to the above-described embodiments, but obviously various changes may be made without departing from the gist of this invention.

For example, the speed signal Vf may be picked up from a back electromotive force of the motor 22.

Although the above description of the invention made by the present inventors has been mainly directed to an application field of the motor control of HDDs and FDDs from which the background of the invention depends. The application field is not limited only to this, but the invention is also applicable to a motor control of optical disk drives or other storage medium drives.

The typical advantageous effects of this invention disclosed in this application are summarized as in the following.

It becomes possible to provide a high precision speed control of a motor and a reliable and smooth restart of a motor, by using a circuit having a relatively small number of circuit elements.

What is claimed is:

1. A motor speed regulating circuit, comprising:
   a speed signal generator for generating a speed signal having a frequency proportional to the speed of the motor, synchronously with the rotation of the motor;
   a signal processing circuit for converting said speed signal into a digital speed pulse signal alternately taking high and low level binary values;
   a single counter for counting a predetermined standard time synchronously with the high or low level of said speed pulse signal;
   an error detector for detecting a time difference between the period of said speed pulse signal and said predetermined standard time counted by said counter and outputting an error pulse signal having a pulse width corresponding to said time difference;
   a control voltage generator for generating a speed control voltage to be applied to the motor in accordance with the pulse width of said error pulse signal and feedback-controlling the speed of the motor in accordance with said standard time; and
   a starter for starting the motor after the motor is stopped, thereby putting the motor in a rotation state from a stopped state.

2. A motor speed regulating circuit according to claim 1, wherein said starter includes a circuit for applying a start signal to a signal path of said speed control voltage, when the motor is started.

3. A motor speed regulating circuit according to claim 1, wherein said starter includes a circuit for applying a start signal to a signal path of said speed control voltage, when a control signal for controlling an enabled/disabled operation of the motor speed regulating circuit takes a state of said enabled operation.

4. A motor speed regulating circuit according to claim 1, wherein said control voltage generator comprises:
   a charge/discharge circuit for charging/discharging current; and
   a charge pump circuit responsive to said error pulse signal for performing one of the charge and the discharge of said charge/discharge circuit when said error pulse signal indicates that the period of said speed pulse signal is longer than said predetermined standard time, and performing the other of the charge and the discharge of said charge/discharge circuit when said error pulse signal indicates that the period of said speed pulse signal is shorter than said predetermined standard time, and
   wherein the charged voltage at said charge/discharge circuit is outputted as said speed control voltage.

5. A motor speed regulating circuit according to claim 1, wherein said signal processing circuit comprises:

a comparator for converting said speed signal into said digital speed pulse signal alternately taking high and low level binary values, by comparing said speed signal with a predetermined level; and
a frequency divider for frequency-dividing said speed pulse signal from said comparator and supplying said frequency-divided speed pulse signal to said error detector, and
wherein said error detector detects a time difference between the period of said frequency-divided speed pulse signal and said predetermined standard time counted by said counter.

6. A motor speed regulating circuit according to claim 1, wherein said signal processing circuit comprises:
   a comparator for converting said speed signal into said digital speed pulse signal alternately taking high and low level binary values, by comparing said speed signal with a predetermined level, and supplying said speed pulse signal to said error detector, and
   wherein said error detector detects a time difference between the period of said speed pulse signal and said predetermined standard time counted by said counter.

7. A motor speed regulating circuit according to claim 1, wherein said starter includes a circuit for operating said control voltage generator to apply a start signal to the motor, when the motor is started.

8. A motor speed regulating circuit according to claim 7, wherein said control voltage generator comprises:
   a charge/discharge circuit for charging/discharging current; and
   a charge pump circuit responsive to said error pulse signal for performing one of the charge and the discharge of said charge/discharge circuit when said error pulse signal indicates that the period of said speed pulse signal is longer than said predetermined standard time, and performing the other of the charge and the discharge of said charge/discharge circuit when said error pulse signal indicates that the period of said speed pulse signal is shorter than said predetermined standard time, and
   wherein the charged voltage at said charge/discharge circuit is outputted as said speed control voltage.

9. A motor speed regulating circuit according to claim 8, wherein said starter includes a circuit for operating said charge pump circuit to flow a charge current to said charge/discharge circuit, when the motor is started.

10. A motor speed regulating circuit according to claim 8, wherein:
    said starter includes a comparator for comparing the charge voltage of said charge/discharge circuit with a predetermined voltage; and
    said comparator responsive to a control signal for controlling an enabled/disabled operation of the motor speed regulating circuit taking a state of an enabled operation, for operating said charge pump circuit to flow a charge current to said charge/discharge circuit until the charged voltage of said charge/discharge circuit reaches said predetermined voltage.

11. A motor speed regulating circuit according to claim 1, wherein said starter includes a circuit for operating said control voltage generator to apply a start signal to the motor, when a control signal for controlling an enabled/disabled operation of the motor speed regulating circuit takes a state of an enabled operation.

12. A motor speed regulating circuit according to claim 1, wherein at least a portion of the motor speed regulating circuit is formed on a semiconductor chip.

13. A storage medium device, comprising:

a motor for rotating a disk of storage medium;

read/write means for performing at least data read and data write relative to the rotated disk;

a speed signal generator for generating a speed signal having a frequency proportional to the speed of the motor, synchronously with the rotation of the motor;

a signal processing circuit for converting said speed signal into a digital speed pulse signal alternately taking high and low level binary values;

a signal counter for counting a predetermined standard time synchronously with the high or low level of said speed pulse signal;

an error detector for detecting a time difference between the period of said speed pulse signal and said predetermined standard time counted by said counter and outputting an error pulse signal having a pulse width corresponding to said time difference;

a control voltage generator for generating a speed control voltage to be applied to the motor in accordance with the pulse width of said error pulse signal and feedback-controlling the speed of the motor in accordance with said standard time; and a starter for starting the motor after the motor is stopped, thereby putting the motor in a rotation state from a stopped state.

14. A storage medium device according to claim 13, wherein said starter includes a circuit for operating said control voltage generator to apply a start signal to the motor, when a control signal for controlling an enabled/disabled operation of the motor takes a state of an enabled operation.

15. A storage medium device according to claim 14, wherein said control voltage generator comprises:

a charge/discharge circuit for charging/discharging current; and a charge pump circuit responsive to said error pulse signal for performing one of the charge and the discharge of said charge/discharge circuit when said error pulse signal indicates that the period of said speed pulse signal is longer than said predetermined standard time, and performing the other of the charge and the discharge of said charge/discharge circuit when said error pulse signal indicates that the period of said speed pulse signal is shorter than said predetermined standard time, and wherein the charged voltage at said charge/discharge circuit is outputted as said speed control voltage.

16. A storage medium device according to claim 15, wherein:

said starter includes a comparator for comparing the charge voltage of said charge/discharge circuit with a predetermined voltage; and said comparator responsive to said control signal for controlling said enabled/disabled operation of the motor taking a state of said enabled operation, for operating said charge pump circuit to flow a charge current to said charge/discharge circuit until the charged voltage of said charge/discharge circuit reaches said predetermined voltage.

17. A storage medium drive according to claim 13, wherein at least a portion of the storage medium drive is formed on a semiconductor chip.

* * * * *